No. 869,474. PATENTED OCT. 29, 1907.
L. ATWOOD.
FISHING REEL.
APPLICATION FILED DEC. 29, 1905.
2 SHEETS—SHEET 2.
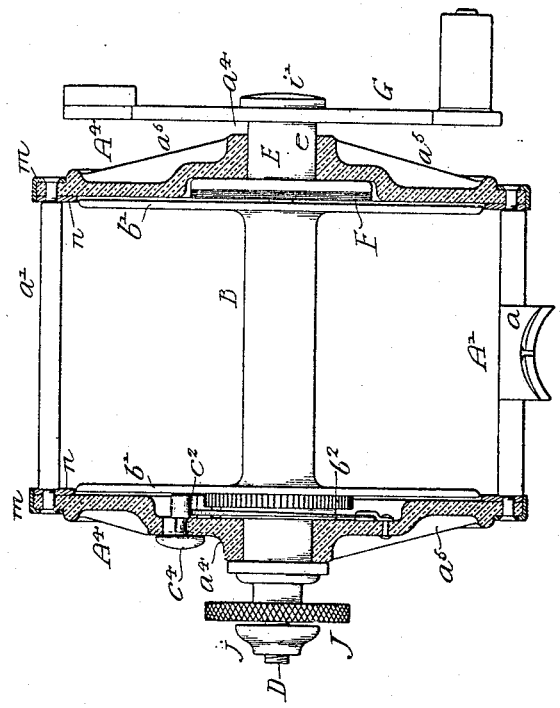
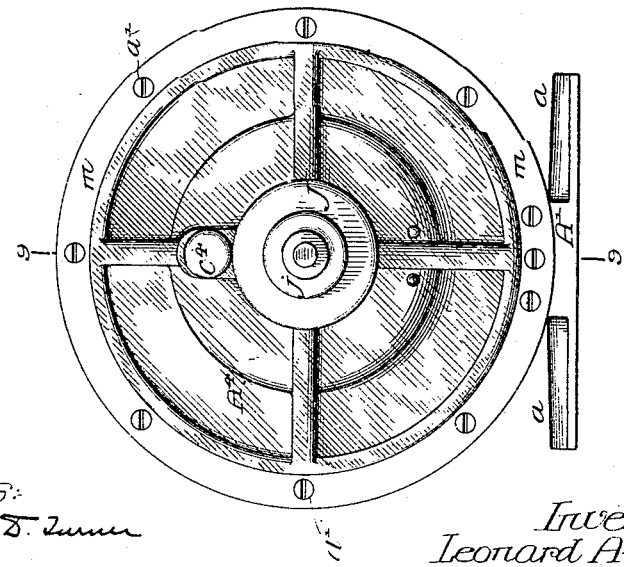
Witnesses:
Inventor:
Leonard Atwood.
by his Attorneys;
Howson & Howson

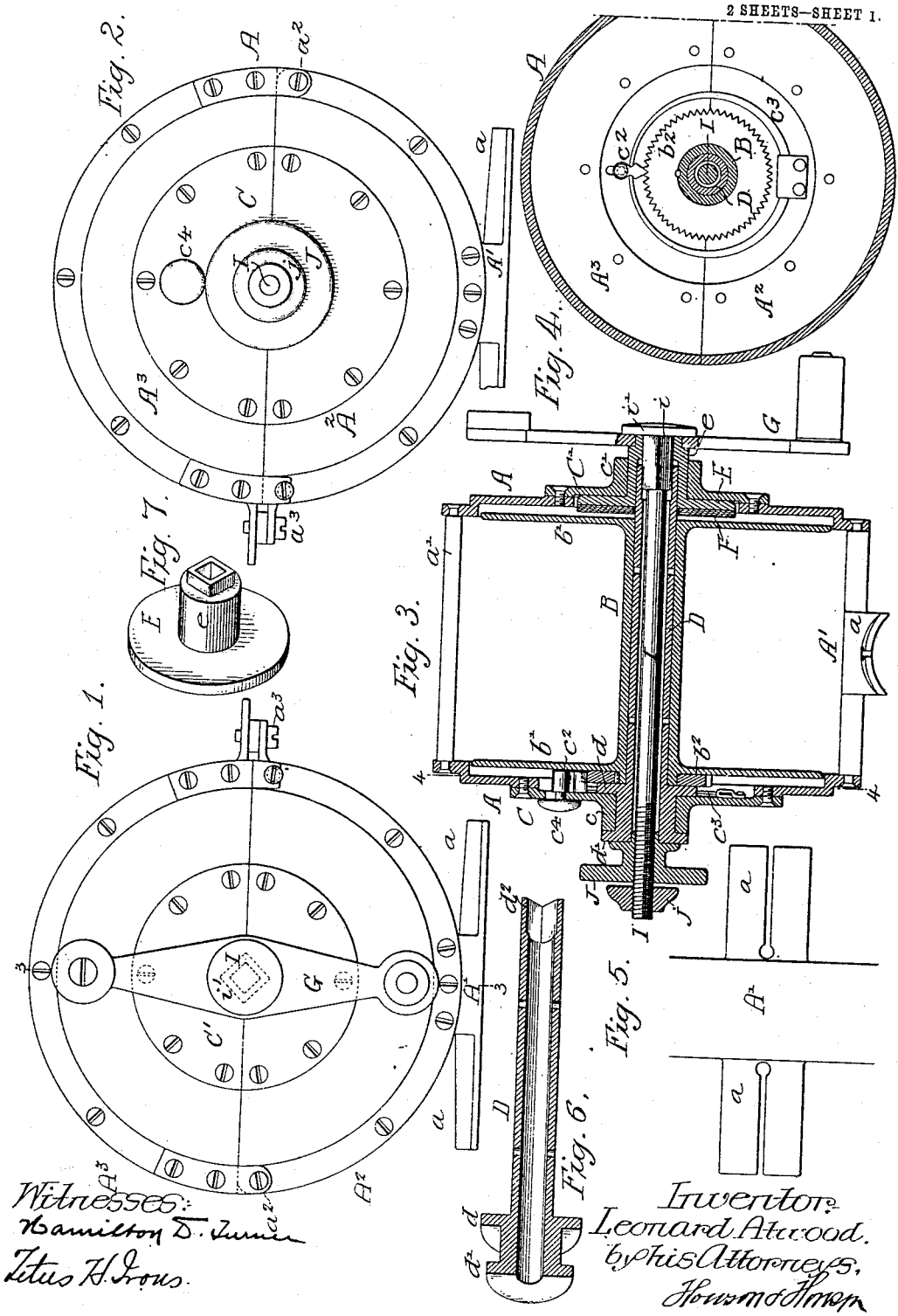

UNITED STATES PATENT OFFICE.

LEONARD ATWOOD, OF PHILADELPHIA, PENNSYLVANIA, ASSIGNOR OF ONE-FOURTH TO JOHN M. O. HEWITT, OF PHILADELPHIA, PENNSYLVANIA.

FISHING-REEL.

No. 869,474.        Specification of Letters Patent.        Patented Oct. 29, 1907.

Application filed December 29, 1905. Serial No. 293,859.

*To all whom it may concern:*

Be it known that I, LEONARD ATWOOD, a citizen of the United States, residing in Philadelphia, Pennsylvania, have invented certain Improvements in Fishing-Reels, of which the following is a specification.

The object of my invention is to so construct a fishing reel that the tension on the spool can be regulated to any degree required while fishing, so that after a fish strikes the tension can be at once applied, the amount of tension being determined by the angler as he is manipulating the reel and playing the fish.

A further object is to provide substantial bearings for the spindle and to make transparent sides.

By my invention I am enabled to materially simplify the construction of a fishing reel, yet gain considerable advantage over any reel now on the market.

Referring to the accompanying drawings:—Figure 1, is a view looking at the handle end of the reel; Fig. 2, is a view looking at the opposite end of the reel; Fig. 3, is a transverse sectional view on the line 3—3, Fig. 1; Fig. 4, is a sectional view on the line 4—4, Fig. 3; Fig. 5, is a plan view showing the reel seat; Fig. 6, is a sectional perspective view showing one part of the hollow spindle; Fig. 7, is a perspective view of the second part of the spindle and its attached friction disk. Fig. 8, is an end view showing the body portion made of glass, and Fig. 9, is a sectional view on the line 9—9, Fig. 8.

A, A are the two sides of the reel frame being connected together by the base plate A' carrying the reel seat $a$ and by a series of rods $a'$ which are secured to the sides A, A by screws or rivets. As shown in Figs. 1 and 2, the reel frame may be made in halves $A^2$, $A^3$ which are connected together by a hinged joint $a^2$ at one side and by a screw $a^3$ which passes through lugs on the opposite side. The sides may be made solid as shown in Fig. 8.

B is the reel spool having extended flanges $b'$ which rest in cavities in the sides A, A as clearly shown in Fig. 3. The body of the spool is hollow for the passage of the part D of a hollow spindle.

In the present instance, secured to one side plate A is a split plate C having a bearing $c$. The part D of the spindle has one end mounted in this bearing and is provided with two flanges $d$, $d'$ extending on each side of said bearing so as to prevent this part of the hollow spindle moving longitudinally.

Secured to the hub of the spool B is a toothed escapement wheel $b^2$ and carried by the plate C in the present instance is a click $c^2$ having the ordinary point which engages the toothed escapement wheel, while secured to the plate C is an ordinary spring $c^3$ which holds the click in a central position. A pin on the click projects through a slot in the plate C and is provided with a button $c^4$ so that by moving the button towards and from the center of the reel the click can be thrown into and out of action. This click is similar in construction to the reel clicks now on the market and, therefore, I lay no claim to it.

On the opposite end of the reel is a split plate C' having a bearing $c'$ for the reception of a hub $e$ forming the second part of the hollow spindle and having a friction disk E. Between the face of this friction disk and one of the flanges of the spool B is mounted a washer F of leather, fiber, or other suitable material, which forms a friction surface for both the reel and the disk.

As shown in Fig. 7, the part $e$ of the spindle has a squared end to which is fitted a handle G whereby the disk E may be turned.

Passing through the part D of the hollow spindle is a tension rod I having a head $i'$ and a squared portion adjacent to one end, designed to fit into a correspondingly squared opening in the part $e$ of the spindle, so that the tension rod and friction disk must turn with the handle.

The end $d^2$ of the part D of the spindle is also internally squared to receive the squared portion $i$ of the tension rod, so that the spindle will thus turn with the handle and friction disk. The opposite end of the tension rod I is screw threaded for the reception of a handled nut J and back of this nut is a jam nut $j$. The nut J has a flange which enters the opening in the adjacent portions of the hollow spindle so as to keep the nut central and all the parts in perfect alinement.

It will be noticed that if the nut J is turned in one direction it will cause the rod to draw the parts together, forcing the friction disk E against the washer F and the washer against the spool, the flange $d$ on the opposite end of the hollow spindle resisting the thrust of the spool so that the spool is held by friction between the said flange $d$ and the friction disk E. It is obvious that by turning the nut J, more or less pressure can be applied to the spool.

When the parts are in the position shown in Fig. 3, for instance, the spool is perfectly loose and free of the control of the handle and when the nut is turned so as to draw the parts together, the pressure can be so applied that the spool becomes rigidly fixed to the handle, as it has no movement independent of it.

The tension nut being on the side of the reel opposite to that upon which the handle is mounted, it will be seen that while one hand is controlling the handle, a quick adjustment of the tension mechanism can be made by the other hand when the reel is being turned by the angler.

When it is wished to play the fish after the strike and the fish takes the line, one hand can hold the rod and handle while the other can be used to adjust the nut J to apply more or less friction upon the line, according to the amount of pull determined by practice. The moment the line begins to slacken the handle can be turned so as to quickly take up the slack, and if necessary, the nut can be backed off so as to release the spool. It will, therefore, be seen that when the spool is turned by turning the handle, the parts revolve in the bearings c, c', but when the spool revolves by the pull of the fish on the line, then the spool revolves on the part D of the hollow spindle.

The mechanism above described can be thrown into and out of action as my improved mechanism does not interfere with the use of the click, and the friction disk E may, in some instances form an integral part of the handle G if desired, or may be connected through the rod I without departing from my invention.

Holes are made in the part D of the hollow spindle so as to allow lubricant to be inserted between it and the spool in order that the latter may turn freely on the spindle.

From the above it will be seen that the hollow portion D and the hub e of the friction disk E form, in fact, a two-part spindle; one part being mounted in a bearing on one side of the reel and the other part being mounted in a bearing on the opposite side. While both parts are connected to turn in unison, one of them has a slight longitudinal movement independently of the other so that the spool can be gripped between the flange on the part D and the friction disk. I have used the term "two-part spindle" in the claims meaning these two parts of the device.

I may make each side A of the reel in a single piece instead of the two parts hinged together as in Figs. 1 and 2, and the side members may be made of glass instead of metal. In Figs. 8 and 9, I have shown glass side members $A^4$ having bearings $a^4$ formed integral therewith and when the side members are made as shown in the drawings with ribs $a^5$, the glass is pressed, making a very substantial structure. Each side member is bound with metallic rings m and n and the rings m are flanged to extend over the edge of the glass as shown, while the two sides are connected together by rods a' as in Fig. 3;—the fastenings passing through the rings and holes or slots in the glass. By this construction, I make a very neat reel in which the interior mechanism is visible through the glass sides and provide one of the best bearings possible for the spindle, namely glass.

I preferably make the reel seat a slotted, as shown in Fig. 5, and the slot may extend through the entire seat or each end may be slotted as indicated in said figure. By this means the rings can clamp the reel seat more firmly on the rod. The slots are preferably made by drilling holes in the seats and making saw kerfs up to the holes, as shown.

I claim:—

1. The combination in a fishing reel, of a casing having bearings, a two-part spindle mounted in the bearings, a friction disk carried on one part of the spindle, a handle on the friction disk part, and a spool mounted on the spindle and placed to be clamped between the two parts of the spindle, substantially as described.

2. The combination in a fishing reel, of a casing, a two-part spindle, a spool mounted on the spindle, the two parts of the spindle being interlocked so that they will turn in unison but with one part free to slide longitudinally, independently of the other part, means for imparting a longitudinal movement to said part, with a friction disk and a handle on said longitudinally movable part, substantially as described.

3. The combination in a fishing reel, of a casing, a two-part spindle having its bearings in the casing, said parts being interlocked so as to turn in unison, one of the parts being free to move longitudinally in respect to the other, a friction disk and a handle on said longitudinally movable part, a spool mounted on the spindle and having a friction surface with which the friction disk comes in contact, and means for adjusting the longitudinally movable part to increase or diminish the friction, said part being on that end of the spindle opposite to the end carrying the friction disk and handle, substantially as described.

4. The combination in a fishing reel, of a casing, a spool, a two-part spindle, a rod attached to one part and extending through the other part, a friction disk on the part to which the rod is attached, a handle on said part, and means for imparting longitudinal movement to the tension rod so as to bring the friction disk into frictional contact with the spool, substantially as described.

5. The combination in a fishing reel of a casing having side members, bearings thereon, a two-part spindle mounted in the bearings, one of said parts being hollow, a rod attached to one part and extending through the hollow part of the spindle, a friction disk and a handle mounted on that part of the spindle to which the rod is attached, a spool mounted on the spindle between the side members of the casing, and a click wheel on the spool, substantially as described.

6. The combination in a fishing reel of a casing having bearings, a spindle having a hollow portion mounted in one of said bearings and having two flanges extending one on each side of said bearing, the second part of the spindle having a friction disk, and being mounted in the other bearing, a spool on the spindle between the friction disk and one of its flanges, a tension rod passing through the said hollow portion of the spindle and having a squared end extending into the friction disk structure and into the end of the spindle, a nut on the opposite end of the tension rod, and a handle operatively connected to the spindle, substantially as described.

7. The combination in a fishing reel, of a casing having bearings, a spindle having a hollow portion mounted in one of the bearings and extending through the body of the reel, said spindle having a squared opening and being provided with flanges arranged to prevent it moving longitudinally in the bearing, a friction disk having a hub mounted in the bearing on the opposite side of the reel, said hub having a squared end, a handle mounted thereon, said hub also having a squared opening, a tension rod having a head and a squared portion under the head, said tension rod passing through the handle and friction disk and through the hollow portion of the spindle, the squared portion of the rod also extending into the squared opening in the spindle, said rod having a screw thread at its opposite end, and a nut on the screw thread arranged to bear against the hollow spindle, substantially as described.

8. The combination in a reel of a body portion and a seat having a slot therein, substantially as described.

In testimony whereof, I have signed my name to this specification in the presence of two subscribing witnesses.

LEONARD ATWOOD.

Witnesses:
WILL A. BARR,
JOS. H. KLEIN.